(12) United States Patent
Takeuchi et al.

(10) Patent No.: US 6,458,487 B1
(45) Date of Patent: Oct. 1, 2002

(54) POSITIVE ACTIVE MATERIAL AND NON-AQUEOUS SECONDARY CELL MADE BY USING THE SAME

(75) Inventors: Hajime Takeuchi, Shizuoka; Koichi Kubo, Yokohama, both of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/463,457

(22) PCT Filed: Jul. 27, 1998

(86) PCT No.: PCT/JP98/03339

§ 371 (c)(1),
(2), (4) Date: Feb. 25, 2000

(87) PCT Pub. No.: WO99/05734

PCT Pub. Date: Feb. 4, 1999

(30) Foreign Application Priority Data

Jul. 25, 1997 (JP) .............................. 9-199880
Aug. 8, 1997 (JP) .............................. 9-215262

(51) Int. Cl.[7] .............................. H01M 4/50
(52) U.S. Cl. ............... 429/224; 429/231.1; 429/218.1; 429/231.6; 429/231.95
(58) Field of Search ............... 429/224, 231.1, 429/231.6, 218.1, 231.95

(56) References Cited

U.S. PATENT DOCUMENTS 5,677,083 A * 10/1997 Tomiyama ............... 429/218.1
5,705,291 A * 1/1998 Amatucci et al. ........... 429/232
5,869,208 A   2/1999 Miyasaka ................... 429/224
6,159,636 A * 12/2000 Wang et al. ................ 429/223

FOREIGN PATENT DOCUMENTS

| JP | 8-162114  | 6/1996 |
| JP | 9-35715   | 2/1997 |
| JP | 9-50810   | 2/1997 |
| JP | 9-55210   | 2/1997 |
| JP | 9-245836  | 9/1997 |
| JP | 10-172571 | 6/1998 |

* cited by examiner

*Primary Examiner*—Laura Weiner
(74) *Attorney, Agent, or Firm*—Foley & Lardner

(57) ABSTRACT

The present invention provides a positive electrode active material comprising: a positive electrode active material body having a composition of $Li_{1+x}Mn_{2-x-y}M_yO_4$ wherein M denotes at least one element selected from elements other than Mn, alkaline metal elements and alkaline earth metal elements, $0 \leq x \leq 0.2$ and $0 \leq y \leq 0.3$; and a cover layer formed on a surface of the positive electrode active material body, the cover layer being composed of a metal oxide containing at least Mn and Li; wherein the number of metal atoms other than Mn and Li, which constitute the cover layer, is 0.01–20 times the number of Mn atoms when the cover layer is subjected to X-ray photoelectric spectroscopy (XPS). It is also preferable that the cover layer is composed of a metal oxide composited with Li, and the cover layer has a normal spinel structure.

7 Claims, 2 Drawing Sheets

POSITIVE ACTIVE MATERIAL AND NON-AQUEOUS SECONDARY CELL MADE BY USING THE SAME

TECHNICAL FIELD

The present invention relates to a positive electrode active material and non-aqueous secondary battery using the same which is improved in high-temperature characteristics so that a lowering of voltage due to high-temperature storage and an increase of impedance can be effectively prevented.

BACKGROUND ART

In recent years, developments of a relatively safe negative electrode material and a non-aqueous electrolyte having an increased decomposition voltage have been advanced, so that various non-aqueous secondary batteries having a high operating voltage have been practically used in many technical fields. In particular, a secondary battery using a lithium ion has excellent characteristics such as a high discharge voltage, light weight, and a high energy density or the like, so that the demand of the secondary battery has been rapidly increased as power sources of equipments such as portable telephone, note book type personal computer, camera-integrated video recorder, and as dispersed-type power sources, power sources of EV (electrical vehicle) and HEV (hybrid electrical vehicle), and a large-scaled battery.

The lithium ion secondary battery of this type comprises: positive and negative electrodes capable of reversibly deintercalate/intercalate lithium ion; and a non-aqueous electrolyte which is prepared by dissolving lithium salt into non-aqueous solvent.

As the positive electrode active material for the above lithium ion secondary battery, for example, lithium-cobalt composite oxides such as $LiCoO_2$, lithium-nickel composite oxides such as $LiNiO_2$, lithium-manganese composite oxides such as $LiMn_2O_4$ and other metal oxides are generally used.

However, in case of the above secondary battery using metal oxides such as lithium-cobalt composite oxide or the like, a theoretical capacity of the battery can be increased while there is posed a disadvantage such that a discharge potential becomes large in comparison with the batteries using the aforementioned other two composite oxides. As a result, the discharge capacity in a range where the non-aqueous electrolyte is not decomposed is lowered to be about a half of the theoretical capacity. In addition, since cobalt as a rare resource was used as a material for constituting the battery, there was also posed a problem of disadvantageously increasing a manufacturing cost of the battery.

On the other hand, in case of the secondary battery using metal oxides such as lithium-nickel (composite) oxide, a large theoretical capacity and an appropriate discharge potential can be obtained. However, there were problems of changes in the discharge potential and lowering the charge/discharge capacity. The change of discharge potential is caused in relation to a change of crystalline structure during the charge/discharge process of the battery, while the lowering the charge/discharge capacity is resulted from collapse of the crystalline structure which is caused in accordance with progress of the charge/discharge cycles. With respect to the aforementioned problems, drastic measures to solve the problems have not been taken at all. As a result, there has been posed a problem such that a characteristic stability and reliability of the battery are insufficient.

In contrast, in case of the secondary battery using lithium-manganese composite oxide, though the theoretical capacity is slightly lowered in comparison with the batteries using the aforementioned other two composite oxides, the battery exhibits an appropriately higher charge/discharge potential. In addition, even in an over-charge state ($\lambda$ $MnO_2$) where the lithium ions are completely extrated from (got out of) the positive electrode active material, it has been confirmed that the crystalline structure of the positive electrode active material can be maintained to be stable.

Further, this temperature at which the reaction of oxygen to get out of the active material in the over-charge state starts is a high temperature exceeding 400° C., which is greatly higher than operating temperature of the battery. Therefore, the secondary battery using lithium-manganese composite oxide can perform the charge/discharge operation with a high capacity close to the theoretical capacity, and is free from an accident of explosion due to ignition or spark in the battery, so that the battery exhibits an extremely high safety. Due to such remarkable advantages which cannot be easily obtained, the development of the secondary battery has been promoted so as to realize an actual use.

However, in case of the secondary battery using the positive electrode materials such as lithium-manganese composite oxide, there has been noted that the following unfavorable phenomena are liable to occur in comparison with the batteries using other type materials. That is, the lowering of the capacity becomes remarkable when the charge/discharge operations are repeated under a temperature higher than 40° C., an open-circuit voltage (OCV) after preserving or storing the battery under a high temperature of 40° C. or higher is lowered and the capacity of the battery is also decreased or the like. Accordingly, it has been recognized that the secondary batteries are not practically or commercially available if the aforementioned problems are not solved.

The present invention had achieved to solve the aforementioned problems and an object of the present invention is to provide a positive electrode active material and a non-aqueous secondary battery capable of suppressing the lowering of the capacity in accordance with the progress of charge/discharge cycles at a high temperature, and capable of suppressing the lowering of the open-circuit voltage (OCV) and capacity even after the battery is preserved or stored in a high-temperature situation for a long time.

DISCLOSURE OF THE INVENTION

In order to achieve the aforementioned object, the inventors of this invention had eagerly studied. As a result, the inventors had obtained the following findings. That is, when a non-aqueous secondary battery was prepared in such a manner that a positive electrode active material having a composition of $Li_{1+x}Mn_{2-x-y}M_yO_4$ wherein $0 \leq x \leq 0.2$, $0 \leq y \leq 0.3$, and M denotes metal element other than Mn and M is at least one element other than alkaline metal and alkaline earth metal was prepared and then a cover layer composed of metal oxide having a predetermined composition is formed on at least part of surface of the positive electrode active material, there can be provided significant effects such that the lowering of the capacity in accordance with the progress of charge/discharge cycles at a high temperature can be effectively suppressed and the lowering of the open-circuit voltage (OCV) and capacity even after the battery is preserved or stored in a high-temperature situation can be also effectively suppressed.

In this regard, it is preferable that the cover layer contains at least Mn and Li, and the cover layer preferably has a composition in which the number of metal atoms other than Mn and Li is 0.01–20 times of the number of Mn atoms. In the present invention, the composition of the cover layer can be measured or identified by means of X-ray photoelectric spectroscopy (XPS) method. That is, in the XPS method, peak intensities of photoelectron at detecting angle of 45 degree are measured. Then, from relative sensitivity coefficient, we can know kinds of the atoms existing on the surface of the positive electrode active material and a concentration of the atom, whereby an atomic ratio of the respective atoms can be easily calculated.

Conventionally, for the purpose of improving the battery characteristics, the following countermeasures have been considered to be effective. That is, structures of coated electrodes are properly controlled such that pore distribution in the positive electrode is controlled or a contact area between the electrolyte and the positive electrode active material is controlled. As another example of the effective countermeasures, for the purpose of controlling electrochemical reactivity of the electrolyte or controlling an inter action between the electrolyte and the positive electrode, there has been adopted a countermeasure in which a combination of kind of the electrolyte, concentration thereof, kind of solvent or the like is reviewed and properly adjusted.

However, the inventors of this invention had obtained the following findings. That is, among the various characteristic factors of the battery and various materials for constituting the battery, chemical property of the positive electrode active material is particularly important.

The inventors of this invention had obtained a positive electrode active material wherein 3 V charging/discharging capacity per unit weight of the positive electrode active material was 50 mAh/g or less when a charging reaction was performed under conditions such that the positive electrode active material was composed of spinel-type lithium-manganese oxide, a positive electrode composed of the positive electrode active material and a lithium metal electrode were provided in a non-aqueous electrolyte of which lithium salt concentration was 0.3– 3.0 M and amount of the non-aqueous electrolyte corresponded to 200–700 ml per 1 gram of the positive electrode active material thereby to form a battery bath, and after the battery bath (cell) was retained at 50° C. for 24 hours, the charging reaction was performed in a state where a positive electrode potential with respect to Li/Li$^+$ was 4V or less.

The inventors have found that there can be obtained a secondary battery which is improved in high-temperature characteristics so that a lowering of operating voltage due to high-temperature storage and an increase of impedance can be effectively prevented when the positive electrode active material composed of the spinel-type lithium-manganese composite oxide described above is used.

The present invention had achieved on the basis of the aforementioned findings.

That is, a positive electrode active material according to the present invention is characterized by comprising: a positive electrode active material body having a composition of $Li_{1+x}Mn_{2-x-y}M_yO_4$ wherein M denotes at least one element selected from elements other than Mn, alkaline metal elements and alkaline earth metal elements, $0 \leq x \leq 0.2$ and $0 \leq y \leq 0.3$; and a cover layer formed on a surface of the positive electrode active material body, the cover layer being composed of a metal oxide containing at least Mn and Li; wherein the number of metal atoms other than Mn and Li, which constitute the cover layer, is 0.01–20 times the number of Mn atoms when the cover layer is subjected to X-ray photoelectric spectroscopy (XPS).

By the way, since there may be a case where at least part of atoms constituting the cover layer migrates into the active material due to a heat treatment for providing the cover layer onto the surface of the active material, a composition of the cover layer to be set by blending the raw materials is not always coincide accurately with the composition of the cover layer to be detected by XPS.

In the positive electrode active material described above, it is preferable that the cover layer contains at least one metal element selected from the group consisting of III, IV, V family elements in a periodic table.

Further, a positive electrode active material according to another aspect of the present invention is characterized by comprising: a positive electrode active material body having a composition of $Li_{1+x}Mn_{2-x-y}M_yO_4$ wherein M denotes at least one element selected from elements other than Mn, alkaline metal elements and alkaline earth metal elements, $0 \leq x \leq 0.2$ and $0 \leq y \leq 0.3$; and a cover layer formed on at least part of a surface of the positive electrode active material body, the cover layer being composed of a metal oxide composited with Li, and the cover layer having a normal spinel structure.

In another positive electrode active material described above, it is preferable that the cover layer contains at least one metal element selected from the group consisting of III, IV, V family elements in a periodic table.

Further, in the respective positive electrode active materials described above, it is preferable that the cover layer contains Al or Ti.

Furthermore, it is preferable that 3 V charging/discharging capacity per unit weight of the positive electrode active material is 50 mAh/g or less when a charging reaction is performed under conditions such that the positive electrode active material is composed of spinel-type lithium-manganese composite oxide, a positive electrode composed of the positive electrode active material and a lithium metal electrode are provided in a non-aqueous electrolyte of which lithium salt concentration is 0.3–3.0 M and amount of the non-aqueous electrolyte corresponds to 200–700 ml per 1 gram of the positive electrode active material thereby to form a battery bath, and after the battery bath is retained at 50° C. for 24 hours, the charging reaction is performed in a state where a positive electrode potential with respect to Li/Li$^+$ is 4V or less.

In this connection, potentials of 3V and 4V charging/discharging operations are basically measured on the basis of lithium metal potential (Li/Li$^+$). When a non-aqueous secondary battery is constituted by comprising a negative electrode containing lithium metal, the positive electrode active material containing lithium-manganese composite oxide exhibits a plateau region of charge/discharge at a voltage of 3V (2.6–3.2V) and a voltage of 4V (3.8–4.2V) with respect to the lithium potential. This reason is that the 3V charge/discharge reaction is caused by deintercalation/intercalation of the lithium ion at 16c sites of the spinel, while the 4V charge/discharge reaction is caused by deintercalation/intercalation of the lithium ion at 8a-sites of the spinel. Above two kinds of deintercalating/intercalating reactions are peculiar properties of the positive electrode active material, the reactions necessarily cause when the positive electrode active material reaches to the above potential, and the reactions are independent to a kind of material for constituting the negative electrode.

In the present invention, the reason why the 3V charging/discharging capacity per unit weight of the positive electrode active material at the time when the charging reaction is performed after the battery bath is retained at 50° C. for 24 hours is specified to 50 mAh/g or less is as follows. Namely, when the 3V charging/discharging capacity per unit weight of the positive electrode active material exceeds 50 mAh/g, the active material will take a structure to advance the reducing reaction. In this battery system, it becomes impossible to suppress the lowering of the open-circuit voltage (OCV) and the capacity after the battery is stored and retained at a high temperature. In addition, it becomes also impossible to suppress the lowering of the capacity which is caused in accordance with the progress of charge/discharge cycles at high temperature.

The above reaction of lowering OCV is not a reaction for forcibly insert lithium ion by a potential difference but a moderate reaction for making the distribution of lithium ions to direct to an equilibrium state. Therefore, the reaction denotes a degree of easiness of the lithium ion to be inserted into the active material.

That is, in a battery system departed from the range specified by the present invention such that the 3V charging/discharging capacity exceeds 50 mAh/g, lithium ion easily intercalate into 16c sites of the active material from a side of the electrolyte, so that lithium ion can reach to the active material without any obstructions. In this case, the cover layer is not formed or there exists a non-uniform cover layer.

On the other hand, in the range specified in this invention, the cover layer takes a role as a barrier against lithium ion. In case of the present invention, the electrolyte and the active material are effectively separated by the cover layer, so that it becomes possible to prevent the Mn ion constituting a surface layer of the active material from being dissolved into the electrolyte, whereby a cycle characteristic at high temperature can be maintained.

In addition, when lithium ion intercalates into 16c-site of the active material from the side of the electrolyte, the following disadvantage will be invited. Namely, a valence of Mn ion positioned close to 16c-site to be intercalated by lithium ion is lowered thereby to cause a Jahn-Teller deformation, so that it becomes impossible to maintain the spinel structure.

Then, the manganese ion having a lowered valence will occupy 16c-site and 8a-site thereby to block a diffusion path of lithium ion, so that the lowering of the capacity and increase of the impedance will become remarkable. As a result, the battery characteristics after the battery is retained at a high temperature are remarkably lowered, and the lowering the capacity to be caused in accordance with the advance of charge/discharge cycles becomes also remarkable.

By the way, in this invention, the reason why the battery bath is evaluated after being retained under the temperature-environment of 50° C. is as follows. Namely, when the temperature is less than 50° C., the advance of the reaction becomes too slow, so that the battery bath will require a long time for being stored and retained, and it takes much time to evaluate the battery characteristics.

The non-aqueous secondary battery according to the present invention comprises a positive electrode containing the positive electrode active material described above; a negative electrode; and a non-aqueous electrolyte prepared by dissolving lithium salt into a non-aqueous solvent.

In the positive electrode active material according to the present invention, a composition of the active material to be a body is limited to $Li_{1+x}Mn_{2-x-y}M_yO_4$ wherein $0 \leq x \leq 0.2$ and $0 \leq y \leq 0.3$, and M denotes at least one element selected from elements other than Mn, alkaline metal elements and alkaline earth metal elements.

In this regard, the reason why the composition is limited to a lithium-rich composition is that Mn ion is prevented from occupying a position called 8a-site which should be normally occupied by lithium ion, the position being often observed in a lithium-lacking composition. 8a-site as well as 16c-site adjacent thereto form a diffusion path. Therefore, when Mn ion exists at this position, the diffusion of lithium is obstructed, thus being improper material for constituting the battery.

Further, the reason why the excess amount (x) of lithium is specified to a range of 0.2 or less is as follows. Namely, when the amount of lithium exceeds the above range, the valence of Mn is increased, so that the lowering of the capacity characteristic will be remarkable.

As an element (M) to be substituted for a part of Mn, at least one metal element selected from elements other than Mn, alkaline metal elements and alkaline earth metal elements are preferable. It is particularly important for this metal element (M) to have a strong preference to 16d-site. In particular, the metal element (M) may preferably be a metal or semimetal (metalloid) selected from the group consisting of IIIa, IVa, Va, VIa, VIII, IIIb, IVb, Vb, VIb and VIIb (except Mn) family elements in a periodic table (short period-type).

Further, the reason why the addition amount (y) of the substituting element (M) is specified to a range of 0.3 or less is as follows. Namely, when the amount exceeds the above range, the valence of Mn is increased, so that the lowering of the capacity characteristic will be remarkable.

In the present invention, it is preferable that the cover layer is composed of a metal oxide which is composited with lithium. According to this structure, the obstruction to the diffusion movement of lithium ion during the battery reaction performed at the cover layer can be mitigated. That is, generally, the cover layer containing no lithium ion functions as a layer to obstruct the diffusion of lithium ion. However, when lithium ion sites are previously provided in the cover layer, the diffusion of lithium ion can be smoothly performed. For example, in the discharging reaction for intercalating the lithium ion into the active material, a lithium ion in the electrolyte transfers to a lithium ion site in the cover layer, and remains in the cover layer. While, the lithium ion originally existed in the cover layer can diffuse into the active material.

Contrary to this, in the charging reaction, a lithium ion in the active material transfers to a lithium ion site contained in a surface layer of the active material. On the other hand, the lithium ion originally existed in the cover layer can be deintercalated to a side of the electrolyte. In a case where the cover layer is composed of a metal oxide which is not composited with the lithium ion, when a thickness of the cover layer is decreased to be thin, the diffusion of the lithium ion can be smoothly performed.

However, for the purpose of preventing the lowering of the capacity with the advance of charge/discharge cycles at high temperature, preventing the lowering of the open-circuit voltage (OCV) after the battery is preserved and retained at high temperature, and preventing the lowering the initial capacity of the battery, a cover layer having a predetermined thickness or more is necessary as described hereunder. Namely, in order to secure the high-temperature characteristics without impairing the capacity characteristics, it is essential that a metal oxide to be composited with lithium is used as the covering material.

Further, in the present invention, in order to prevent the capacity-lowering of the battery, it is preferable that a bonding strength between the cover layer and the particulate active material body is sufficiently high. In general, it is well known that a crystal lattice of the positive electrode active material repeats swelling (extending) and shrinkage due to the charge/discharge cycles. This phenomenon is caused by changing of valence of Mn ion at the process of the charge/discharge reaction thereby to change a bonding strength between the Mn ion and oxygen ions surrounding the Mn ion.

As described above, when the cover layer having a weak bonding strength with respect to the active material is provided onto a crystalline surface of the active material body of which lattice constant is variable, there is liable to occur a phenomenon such that the cover layer is peeled off with the advance of charge/discharge cycles. Then, there may be a case where the capacity is rapidly lowered with the advance of charge/discharge cycles. As a result, there is posed a disadvantage that such phenomenon becomes more remarkable as the charge/discharge current increases i.e., as the swelling/shrinking speed of the crystal lattice increases.

In the present invention, in order to compensate the above disadvantage, Mn is essentially contained in the cover layer. That is, when Mn ion is contained in the cover layer, a difference in compositions of the active material and the cover layer is mitigated thereby to improve a conformability between the two materials. As a result, the bonding strength of the cover layer is increased, so that it becomes easy to epitaxially cover the surface of the active material with the cover layer.

Accordingly, in addition to the increase of the bonding strength, Mn-ion contained in the cover layer also participate in oxidation/reduction reaction. At this time, the valence of Mn-ion also varies in a similar way as the active material, so that a bond distance of Mn-O in the cover layer is also synchronously changed with a bond distance of Mn-O in the active material. Accordingly, the cover layer becomes to be hardly peeled off. In addition, electrons are not subjected to a strong scattering at an interface between the active material and the cover layer, so that there can be provided an effect of maintaining an excellent electronic conductivity.

A proportion (ratio) of the number of the metallic atoms to be covered together with Mn and Li constituting the cover layer is calculated from an XPS spectrum of the positive electrode active material. In the present invention, an amount of the metal elements other than Mn and Li constituting the cover layer (a total number of the metal elements other than Mn and Li) is required to be 0.01–20 times the number of Mn-atoms. In a case where the amount of the metal element (number of atoms) is less than 0.01 time the number of Mn atoms, the effect of this invention becomes to be insufficient. On the other hand, when a magnification of the number of metallic atoms exceeds 20 times, a peel strength between the active material and the cover layer is disadvantageously lowered.

Further, a thickness of the cover layer is preferably set to a range of 1–100 nm. In this connection, the thickness of the cover layer can be calculated in the following manner. For example, in a case where an active material having a specific area of 1 m$^2$/g is covered with LiMnAlO$_4$ as the covering material having a specific gravity (density) of 3.8 g/cm$^3$ at a covering rate of 1 wt % with respect to the active material body, 1 g i.e., 0.26 cm$^2$ of the cover layer is formed with respect to 100 g of the active material body. Assuming that this cover layer completely cover the surface of the active material body, the covering material means to be spread over the surface area of 100 m$^2$ thereby to form a film. In this case, the thickness of the resultant film is 26 angstroms.

By the way, the reason why the composition of the cover layer is specified by the XPS spectrum of the positive electrode active material is as follows. Namely, the covering layer takes various configurations in accordance with the compositions of the covering layers and covering conditions. For example, in case of a system having a high surface energy, at the surface of the active material body, the covering material would not uniformly cover the active material but formed so as to have island-forms.

In addition, even if the same covering material is used, the covering configuration is changed in accordance with a temperature history to be applied to the covering material. The optimum temperature history is different for a different covering composition. Therefore, to specify the covering configuration, it is required to strictly specify the composition of the covering material and the covering conditions. However, in such a method, it is required to specify numerous conditional factors, thus being complicated.

Therefore, in place of the above method, the present invention adopts a characterization using a surface composition measured from an XPS spectrum of the active material. Further, in a case where the total amount of the metal element (number of detected atoms) is less than 0.01 time the number of manganese atoms constituting the cover layer, the surface composition of the active material is substantially the same as that of untreated active material, and a cover layer having a sufficient thickness is not formed, so that an improvement of the high-temperature characteristics of the battery cannot be attained.

Further, in the cover layer composed of metal oxide which is composited with lithium, it is preferable in view of maintaining a high capacity that the cover layer contains at least one element selected from the group consisting of III, IV, and V family elements as a metal to be composited with lithium. The reason why the high capacity can be maintained is considered as follows. Namely, III, IV and V family elements cannot easily participate to the oxidation/reduction reaction at a potential of battery reaction, while the elements continue to retain a crystal structure during the advance of charge/discharge cycles at high-temperature thereby to stably maintain the capacity of the battery. According to the knowledges obtained from experiments conducted by the inventors of this invention, it has been confirmed that aluminum and titanium are particularly preferable.

Further, in the present invention, the cover layer may be in a crystallized state or amorphous state or a mixed state thereof. However, it is particularly preferable that a crystal structure of the cover layer is a normal spinel structure. Furthermore, it is more preferable that the cover layer is composed of a composite oxide comprising lithium and at least one element selected from the group consisting of III, IV, V family elements in a periodic table. preferable that a crystal structure of the cover layer is a normal spinel structure. Furthermore, it is more preferable that the cover layer is composed of a composite oxide comprising lithium and at least one element selected from the group consisting of III, IV, V family elements in a periodic table.

Furthermore, it is preferable that the active material body is epitaxially covered with the covering material. In particular, when the active material body and the covering layer have the same crystalline structure and the layer epitaxially covers the material body, lithium ion can secure diffusion paths of 8a-16c-8a - - - extending from an inner portion to a surface layer portion of the active material in addition to the diffusion process described above, whereby the smooth diffusion of lithium can be performed.

In addition, regarding to a movement of electron corresponding to the diffusion of lithium-ion, since a potential applied to the electron at the inner portion of the active material is not greatly different from a potential applied to the electron at the surface layer portion of the active material, a strong potential scattering would not occur at interface between the active material phase and the cover layer. Further, a current conduction can be smoothly performed without causing a falling of electron into a localized state of the interface.

Further, In the cover layer composed of metal oxide composited with lithium, the cover layer containing at least one element selected from III, IV and V family elements as a metal to be composited with lithium continues to retain the crystal structure at the time when charge/discharge cycles at high temperature are advanced or the battery is retained at high temperature, because the above metal elements cannot easily participate with the oxidation/reduction reaction at the potential level of the battery reaction. As a result, the capacity of the battery can be stably maintained, thus being preferable.

In order to evaluate a covered state of the cover layer disposed onto the surface of the positive electrode active material body according to the present invention, a method in which a charging capacity is measured after the battery is retained at temperature of 50° C. is practically suitable. That is, a surface-covered active material realizing the following characteristics is preferable. Namely, the active material of which 3V charging capacity per unit weight of the positive electrode active material is 50 mAh/g or less when a charging reaction is performed under conditions such that the positive electrode active material is composed of spinel-type lithium-manganese composite oxide, a positive electrode composed of the positive electrode active material and a lithium metal electrode are provided in a non-aqueous electrolyte of which lithium salt concentration is 0.3–3.0 M and amount of the non-aqueous electrolyte corresponds to 200–700 ml per 1 gram of the positive electrode active material thereby to form a battery bath, and after the battery bath is retained at 50° C. for 24 hours, the charging reaction is performed in a state where a positive electrode potential with respect to $Li/Li^+$ is 4V or less.

Thus, in a case where an effective cover layer is uniformly formed onto the surface of the active material, the 3V charging capacity becomes small. On the other hand, in a case where a cover layer contributing to the reduction reaction is formed, or in a case where the cover layer is not formed, or in a case where the cover layer is short of covering thickness even if the effective cover layer is formed, or in a case where the cover layer is not uniformly formed, the 3V charging capacity becomes large.

The positive electrode active material according to the present invention can be manufactured, for example, in accordance with the following process.

That is, hydroxide, oxide, carbonate, acetate, or nitrate of lithium, and electrolytic manganese dioxide, chemical manganese dioxide, manganese oxide hydroxide, manganese hydroxide, dimanganese trioxide ($M_2O_3$), manganese carbonate, manganese acetate, manganese nitrate, if necessary, various salts of metal substituting a part of Mn are blended and sufficiently mixed to prepare a mixture of a composition range as specified hereinbefore. Then, thus prepared mixture is sintered at a temperature range of 500–900° C. in an atmosphere or in a stream (reflux) of oxygen, if necessary, in various gas atmospheres thereby to obtain an active material body.

On the other hand, hydroxide, oxide, carbonate, acetate, or nitrate of lithium and manganese, and metal compound to be composited with lithium and manganese are blended and sufficiently mixed to prepare a mixture. Then, thus prepared mixture is sintered in an atmosphere or a stream (reflux) of oxygen, if necessary, in various gas atmospheres thereby to obtain an aimed covering material.

When thus prepared covering material and the active material body are mixed by dry process or wet process, the covering of the cover layer can be performed. The cover layer can be also formed in accordance with the following another method in which hydroxide, oxide, carbonate, acetate, or nitrate of lithium and manganese, and metal compound to be composited with lithium and manganese are blended and sufficiently mixed to prepare a mixture. Then, thus obtained mixture is further blended with the active material body, and the mixture is sintered in an atmosphere or a stream of oxygen, if necessary, in various gas atmospheres thereby to obtain a covered active material.

The covered active material can be also manufactured in accordance with the following method in which a previously synthesized active material body is dipped in an appropriate solvent, then lithium salt and manganese salt that are dissoluble to the solvent and metal salt to be composited with lithium and manganese are dissolved into the solvent, after the solvent is uniformly agitated or stirred, this solvent is removed, a resultant material is then sintered in an atmosphere or a stream of oxygen, if necessary, in various gas atmospheres thereby to obtain the covered active material. The latter method is particularly preferable because the active material body and the covering material can be epitaxially bonded to each other.

Further, there can be also provided the following advantage in the latter method. That is, in order to form a uniform cover layer by a solid-phase mixing method, it is preferable to attach the covering material in a state as fine as possible. Concretely, it is preferable to attach the covering material after a particle diameter of the covering material is controlled to be 1/100 or less of a particle diameter of the active material.

In a case where a cover layer having a further uniformity is formed in accordance with the solid-phase mixing method, the following method can be also adopted. Namely, a powder material having a sufficiently low melting point is selected, then a surface of the active material is uniformly sprinkled with the selected powder material. At this state, the sprinkled material is heated and molten, thereafter cooled, thereby to form a predetermined cover layer.

In the above treating method, however, there is a case where atoms of the covering material diffuse into the active material, so that there is also a case where the cover layer having a desired composition and thickness cannot be formed. In contrast, when the cover layer is formed in accordance with the liquid-phase mixing method, it becomes possible to easily form a cover layer having a uniform composition at atomic level and an uniform film thickness at atomic level on the surface of the active material, thus being extremely advantageous.

A non-aqueous secondary battery according to the present invention is constituted by comprising: a positive electrode in which the positive electrode active material as prepared above, conduction filler (electric conductive agent) together with binder or the like are mixed and pressingly molded to be retained by the positive electrode; a negative electrode having a negative electrode active material; wherein the positive electrode and the negative electrode are provided through a non-aqueous electrolyte in a battery case so that the positive and negative electrodes are opposed to each other.

In this regard, as the conduction promoting agent described above, for example, acetylene black, carbon black, graphite or the like are used. Further, as the binder, for example, polytetrafluoroethylene (PTFE), polyvinylidene fluoride (PVDF), ethylene-butadiene-diencopolymer (EPDM), styrene-butadiene rubber (SBR) or the like can be available.

Further, the positive electrode described above is manufactured, for example, in such a manner that the positive electrode active material described above and the binder are suspended in an appropriate solvent to prepare a suspended solution, then the suspended solution is coated onto a collector and dried, thereafter the coated collector is pressed by a pressing machine. In this regard, as a material for constituting the collector, for example, aluminum foil, stainless steel foil, nickel foil or the like are preferably used.

By the way, at the time of preparing the positive electrode, from a standpoint of controlling the contacting-state between the active material and the electrolyte, it is preferable to provide pores or voids (perforations) in the electrode sheets at an appropriate amount and size. That is, in a case where the pore is not formed at all, a contact area between the electrolyte and the active material becomes small thereby to improve the high temperature characteristic, while the battery reaction per se becomes hard to take place thereby to lower a rate property of the battery.

In contrast, in a case where a porosity (rate of pores) becomes excessive, the ratio of contact between the electrolyte and the active material becomes large whereby the battery reaction becomes easy to take place, so that the capacity characteristic, especially rate characteristic of the battery can be improved, while there is a tendency that the high temperature characteristic cannot be maintained.

The above porosity is set to a range of 5–80% from the standpoint described above. However, a range of 10–60% is more preferable, and a range of 10–50% is furthermore preferable. The above porosity can be adjusted by the following manner. Namely, a molding pressure at the time of preparing the electrode by pressingly molding the collector after the active material member is coated onto the surface of the collector is controlled, so that a degree of dispersion of the active material layer is controlled thereby to adjust the porosity.

The above porosity can be also adjusted by appropriately controlling the amount of the binder to be added to the active material member. That is, the following tendencies had been confirmed. When the amount of the binder is increased, the porosity is decreased and the battery reaction per se becomes hard to occur. On the other hand, when the amount of the binder is decreased, the porosity is increased and the high temperature characteristic of the battery cannot be maintained.

In this regard, the appropriate amount of the binder varies in accordance with a kind of the binder and a grain size of the positive electrode active material or the like, and it is difficult to evenly specify the amount. The porosity and pore distribution of the above active material can be measured, for example, by a mercury-injecting type pore-distribution measuring device (Autopore) or the like.

On the other hand, as a negative electrode active material, a material containing carbon material for disintercalating/ intercalating lithium ion, or a material containing chalcogen compound, or an active material comprising a light metal can be used. In particular, when the negative electrode containing carbon material or chalcogen compound is used, the battery characteristics such as cycle life or the like is improved, thus being particularly preferable.

As examples of the carbon material for absorbing/ releasing lithium ion, for example, coke, carbon fiber, pyrolytic carbon, graphite, resin sintered body, mesophase-pitch-type carbon fiber (MCF) or sintered bodies of mesophase spherical carbon or the like are used. In particular, when the liquid crystalline mesophase-pitch-type carbon fiber (MCF) prepared by graphitizing a heavy gravity oil at a temperature higher than 2500° C. or mesophase spherical carbon is used, an electrode capacity of the battery can be increased.

Further, the above carbon materials preferably have an exothermic peak (heat peak) at a temperature of 700° C. or more, more preferably, at a temperature of 800° C. or more when the materials are subjected to a differential thermal analysis. Furthermore, assuming that (101) diffraction peak of a graphite structure of the carbon material detected by an X-ray diffraction (XRD) is ($P_{101}$) and (100) diffraction peak is ($P_{100}$), it is preferable that the carbon material has an intensity ratio of $P_{101}/P_{100}$ ranging from 0.7 to 2.2. In case of the negative electrode containing the carbon material having such the intensity ratio of the diffraction peaks, a rapidly absorbing or releasing the lithium ion can be performed, so that it is effective to combine the negative electrode with the positive electrode containing the aforementioned positive electrode active material which directs to the rapidly-charging/discharging operation.

As examples of the chalcogen compounds for absorbing/ releasing lithium ion, for example, titanium disulfide ($TiS_2$), molybdenum disulfide ($MoS_2$), niobium selenide ($NbSe_2$) or the like can be used. When the chalcogen compounds are used for the negative electrode, a voltage of the secondary battery is lowered, while the capacity of the negative electrode is increased, thereby to increase the capacity of the secondary battery. In addition, a diffusing speed of the lithium ion at the negative electrode is increased, so that it is particularly effective to combine the chalcogen compound with the positive electrode active material used in the present invention.

Further, as examples of the light metals to be used for the negative electrode, for example, aluminum, aluminum alloy, magnesium alloy, lithium metal, lithium alloy or the like can be used.

Furthermore, the negative electrode containing the active material for absorbing/releasing the lithium ion can be manufactured, for example, by a method comprising the steps of suspending the above negative electrode active material and the binder into an appropriate solvent to form a suspended solution, coating the suspended solution onto a collector, and drying then press-contacting the collector. As an example of the collector, for example, collectors composed of copper foil, stainless steel foil, nickel foil or the like are used.

Further, as the binder, for example, polytetrafluoroethylene (PTFE), polyvinylidene fluoride (PVDF), ethylene-butadiene-dien copolymer (EPDM), styrene-butadiene rubber (SBR), carboxymethyl cellulose (CMC) or the like can be available.

Further, the separator described above is formed, for example, from nonwoven fabric composed of synthetic resin, polyethylene porous film, polypropylene porous film or the like.

As the non-aqueous electrolyte, a solution prepared by dissolving electrolyte (lithium salt) into a non-aqueous solvent is used.

The examples of the non-aqueous electrolyte may include cyclic carbonates such as ethylene carbonate (EC), propylene carbonate (PC) or the like; chain carbonates such as dimethyl carbonate (DMC), methylethyl carbonate (MEC), diethyl carbonate (DEC) or the like; chain ethers such as dimethoxyethane (DME), diethoxy ethane (DEE), ethoxymethoxy ethane or the like; cyclic ethers such as tetrahydrofuran (THF), 2-methyltetrahydrofuran (2-MeTHF) or the like; fatty acid ethers of lactone, γ-butyrolactone (γ-BL) or the like; nitrides such as acetonitrile (AN) or the like; and sulfides such as sulfolane (SL), dimethyl sulfoxide (DMSO) or the like.

The above non-aqueous solvent can be singularly used, and can be also used as a mixed solvent prepared by mixing at least two kinds of the above solvents. In particular, it is preferable to use; a solvent composed of at least one solvent selected from the group consisting of EC, PC and γ-BL; or a mixed solvent which is prepared by mixing at least one solvent selected from the group consisting of EC, PC and γ-BL with at least one solvent selected from the group consisting of DMC, MEC, DEC, DME, DEE, THF, 2-MeTHF and AN.

Further, in a case where the negative electrode active material containing carbon material for absorbing/releasing the lithium ion is used as a material for constituting the negative electrode, in view of improving the cycle life of the secondary battery comprising the negative electrode, it is preferable to use: a mixed solvent composed of EC, PC, and γ-BL; a mixed solvent composed of EC, PC, and MEC; a mixed solvent composed of EC, PC, and DEC; a mixed solvent composed of EC, PC, and DEE; a mixed solvent composed of EC and AN; a mixed solvent composed of EC and MEC; a mixed solvent composed of PC and DEC; a mixed solvent composed of PC and DEC; or a mixed solvent composed of EC and DEC.

The examples of the electrolytes may include lithium salts such as lithium perchlorate ($LiClO_4$), lithium phosphate hexafluoride (LiPF6), lithium boride fluoride ($LiBF_4$), arsenic lithium hexafluoride ($LiAsF_6$), trifluoromethasulfonic lithium ($LiCF_3SO_3$), bis-trifluoromethyl sulfonylimide lithium [$LiN(CF_3SO_2)_2$] or the like. In particular, when $LiPF_6$, $LiBF_4$, $LiN(CF_3SO_2)_2$ are used, electric conductivity and safety can be improved, thus being preferable. An amount of these electrolytes to be dissolved into the non-aqueous solvent is preferably set to a range of 0.1–3.0 mol/l.

According to the non-aqueous secondary battery as constructed above, since the cover layer composed of metal oxide having a predetermined composition or crystal structure is formed on the surface of the positive electrode active material body, it is possible to suppress the lowering of the capacity in accordance with the advancement of charging/discharging cycles at high temperature, and to suppress the lowerings of the open-circuit voltage (OCV) and capacity of the battery after the battery is preserved at high temperature.

This functional mechanism is presumed to be realized by reason of that the dissolving of Mn-ion to the electrolyte side, which is caused by the contact of the active material body with the electrolyte, can be prevented by the action of the cover layer. That is, in case of the positive electrode active material having no cover layer, Mn-ion will dissolve from the surface of the active material, and the crystal structure of a surface layer of the active material is disturbed, so that a smooth diffusion of Li-ion and transfer of electrons are obstructed by the dissolution of the Mn-ion thereby to lower the capacity of the battery. On the other hand, the dissolved Mn-ion is deposited onto a surface of the negative electrode having a lower potential thereby to block the diffusion path of lithium ion at the surface of the negative electrode.

The reason why the potential-change after the battery is preserved at high temperature is presumed that the cover layer has a function of suppressing the promotion of the reduction reaction of Mn at the surface layer when the battery is preserved at high temperature. That is, the cover layer is occupied with metal elements of which valence is hardly changed, so that a reaction rate of the lithium ion being intercalated from the electrolyte side can be suppressed.

In general, the provision of such the cover layer exhibits a function of suppressing the smooth diffusion of the lithium ion. However, in the present invention, the cover layer having the same crystal structure as the active material body is formed, or the cover layer composed of oxide prepared by compositing lithium ion with metal element of which valence is hardly changed is formed, so that the smooth diffusion path for lithium ion can be secured.

BEST MODE FOR EMBODYING THE INVENTION

Figure 1:
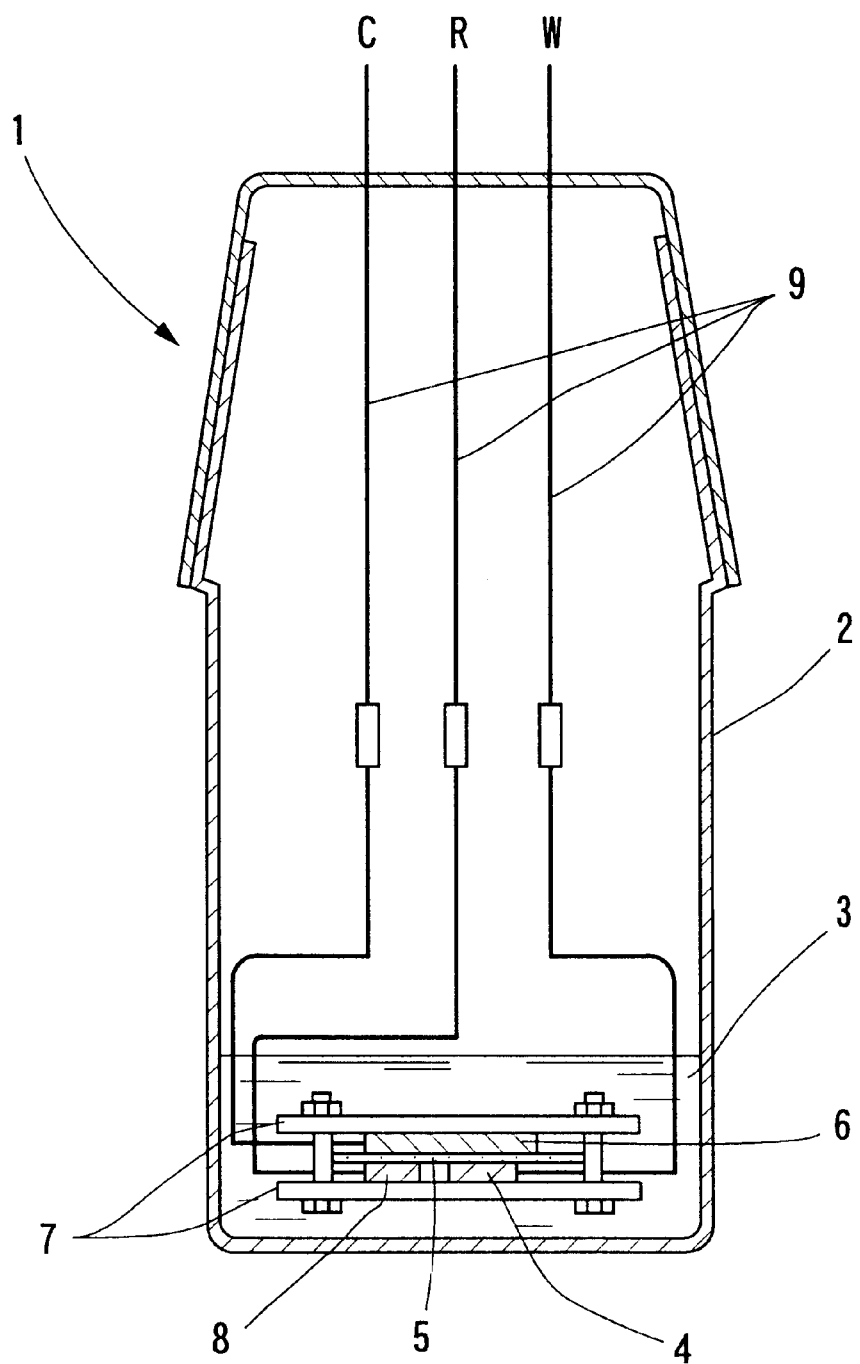
FIG. 1 is a sectional view showing a structure of a non-aqueous secondary battery for evaluating a positive electrode.

Next, the present invention will be explained more concretely with reference to the following Examples. Note, it should be understood that the present invention shall not be limited to the following Examples, and the present invention can also be embodied in other specific forms by modifying the Examples without departing from the scope or spirit of the present invention.

[Preparation of Positive Electrodes]

EXAMPLES 1–21

$LiOH \cdot H_2O$ powder and $MnO_2$ (electrolytic manganese) powder were blended so as to have an atomic ratio of Li:Mn=1.1:1.9, then uniformly mixed to form a powder mixture. The powder mixture was fired in an oxygen atmosphere at a temperature of 750° C., thereby to prepare an active material body ($Li_{1.1}Mn_{1.9}O_4$).

EXAMPLES 22–27

$LiOH \cdot H_2O$ powder, $MnO_2$ (electrolytic manganese) powder and cobalt oxide powder were blended so as to have an atomic ratio of Li:Mn:Co=1:1.7:0.3, then sufficiently mixed to form a powder mixture. The powder mixture was fired in reflux of oxygen at a temperature of 750° C., thereby to prepare an active material body ($LiMn_{1.7}Co_{0.3}O_4$).

Then, 30 ml of pure water was added to 10 g of each of the above active material bodies thereby to prepare the respective suspended solutions. Subsequently, a predetermined amount of lithium nitrate, manganese nitrate and nitrate salt of metal were added to the respective suspended solutions and sufficiently stirred. Thereafter, each of the suspended solutions was heated and dehydrated, then fired in reflux of oxygen at temperature shown in Table 1, thereby to prepare the respective active materials.

In this regard, in a case where the materials such as Ti, Sn that are easily hydrolyzed are used, ethyl alcohol was used in place of the pure water, and isopropyl alkoxides of Li, Mn, Ti, Sc were used. Other than those described above, the suspended solution was prepared in accordance with the same manner as above process.

Further, in case of Examples 22 and 23, nitrate salts of the metals constituting the cover material were mixed so as to have a predetermined ratio. Then, thus obtained mixed powder was fired at 900° C. thereby to obtain the covering materials. Subsequently, thus obtained each of the covering materials was pulverized to obtain particles having an average particle diameter of 0.1 μm. Thereafter, the active material body and the covering material were sufficiently dry-mixed thereby to obtain the respective positive electrode active materials.

Comparative Example 1

A positive electrode active material of Comparative Example 1 was prepared in accordance with the same as in Example 22 except that the cover layer was not formed.

Comparative Example 2

$LiOH.H_2O$ powder and $MnO_2$ (electrolytic manganese) powder were blended so as to have an atomic ratio of Li:Mn=1.1:1.9, then uniformly mixed to form a powder mixture. The powder mixture was fired in an oxygen atmosphere at a temperature of 750° C., thereby to prepare an active material body ($Li_{1.1}Mn_{1.9}O_4$).

On the other hand, 10g of sodium hydroxide was dissolved into 90 g of water thereby to prepare an alkaline solution, and 10 g of aluminum hydroxide was further dissolved into the solution. Then, 100 g of the active material powder of $Li_{1.1}Mn_{1.9}O_4$ previously synthesized was poured into the alkaline solution while the solution was stirred to form a slurry. 50 grams of 2% LiOH solution was added to to the slurry drop by drop and stirred for one hour. Thus obtained slurry was dried at 120° C. for two hours, thereby to prepare a positive electrode active material according to Comparative Example 2.

Comparative Example 3

A predetermined amount of lithium nitrate and aluminum nitrate were added to the ethyl alcohol suspended solution of the active material obtained in Example 1, and the suspended solution was sufficiently stirred. Thereafter, solid components of thus obtained suspended solution was separated and dried, subsequently heat-treated at a temperature of 600° C., thereby to prepare the positive electrode active material according to Comparative Example 3.

Comparative Examples 4–7

A predetermined amount of $B_2O_3$ (Comparative Example 4), $SiO_2$ (Comparative Example 5), $LiOH.H_2O$ and $B_2O_3$ (Comparative Example 6), $H_3BO_3$ (Comparative Example 7) were added to the active material bodies obtained in Example 1 to prepare respective powder mixtures. Thereafter, thus obtained respective powder mixtures were heat-treated at a temperature of 600° C., thereby to prepare the respective positive electrode active materials according to Comparative Examples 4–7.

Thus prepared respective positive electrode active materials, acetylene black as a conduction promoting agent and teflon powder as a binder were blended so as to have a weight ratio of 80:17:3 thereby to prepare the respective positive electrode material mixtures. Then, the respective positive electrode material mixtures were attached to collectors formed of stainless steel, thereby to form the positive electrodes each having a size of 10 mm×10 mm×0.5 mm.

[XPS Measurement]

The XPS measurement was conducted under the following conditions: an X-ray intensity was 4 kW, a path energy was 300 eV, and an energy step was 1.00 eV. Then, taking the peak intensity, relative sensitivity coefficient, detecting depth obtained from XPS spectrum into consideration, an element existing ratio (M/Mn) in the cover layer was measured.

[Preparation of Negative Electrode]

Lithium metal foil was integrally attached to a collector formed of stainless steel thereby to prepare a negative electrode.

[Preparation of Reference Electrode]

Lithium metal foil was integrally attached to a collector formed of stainless steel thereby to prepare a reference electrode.

[Preparation of Non-aqueous Electrolyte]

A non-aqueous electrolyte was prepared by dissolving $LiClO_4$ as electrolyte into a mixed solvent composed of propylene carbonate and dimethoxyethane so that a concentration of $LiClO_4$ was 1 mol/l.

[Preparation of Battery for Evaluating Positive Electrode]

The battery members such as positive electrode, negative electrode, reference electrode and non-aqueous electrolyte which had been sufficiently dried were placed in argon atmosphere. Thereafter, using these battery members, a battery for evaluating a lithium ion secondary battery comprising a beaker-shaped glass cell was assembled as shown in FIG. 1.

As shown in FIG. 1, the battery 1 for the evaluation comprises the glass cell as a battery container, and 20 ml of non-aqueous electrolyte 3 is accommodated in the glass cell 2. The positive electrode 4 and the negative electrode 6 accommodated in a bag-shaped separator 5 are laminated in a state where the separator 5 is disposed therebetween to form a laminated body. The laminated body is dipped in the non-aqueous electrolyte 3 retained in the glass cell 2. Two presser plates 7 clamp the laminated body therebetween, and fix the laminated body. A reference electrode 8 accommodated in the bag-shaped separator 5 is dipped in the non-aqueous electrolyte 3 retained in the glass cell 2 described above.

One end of respective three electrode wirings 9 is led out to an exterior so as to penetrate through an upper portion of the glass cell 2, while the other end of the respective wirings are connected to the positive electrode 4, the negative electrode 6 and the reference electrode 8, respectively. The glass cell 2 is subjected to a hermetically sealing treatment so that atmosphere will not invade into the glass cell 2 during the charging/discharging test.

[Evaluation of Battery]

With respect to each of thus prepared batteries for evaluating the lithium ion secondary batteries according to Examples and Comparative Examples, a charging operation was conducted at a current value of 1 mA until a potential difference between the reference electrode and the positive electrode attained to 4.3V, then, the current was stopped for 30 minutes. Thereafter, a discharging operation was conducted at a current value of 1 mA until the potential difference between the reference electrode and the positive electrode reached to 3V, then, the current was again stopped for 30 minutes. A cycle test in which the above charging/discharging cycle was repeated 30 times (cycles) was conducted in an oven of which temperature is controlled to 55° C. Then, a discharging capacity of the battery was measured at completion of 1 cycle and 30 cycles. for evaluating the lithium ion secondary batteries according to Examples and Comparative Examples, a charging operation was conducted at a current value of 1 mA until a potential difference between the reference electrode and the positive electrode attained to 4.3V, then, the current was stopped for 30 minutes. Thereafter, a discharging operation was conducted at a current value of 1 mA until the potential difference between the reference electrode and the positive electrode reached to 3V, then, the current was again stopped for 30 minutes. A cycle test in which the above charging/discharging cycle was repeated 30 times (cycles) was conducted in an oven of which temperature is controlled to 55° C. Then, a discharging capacity of the battery was measured at completion of 1 cycle and 30 cycles.

On the other hand, a charging operation was conducted under a room temperature (25° C.) at a current value of 1 mA until a potential difference between the reference electrode and the positive electrode attained to 4.3V, then, the current was stopped for 30 minutes. Thereafter, a discharging operation was conducted at a current value of 1 mA until the potential difference between the reference electrode and the positive electrode reached to 3V. Thereafter, the battery was preserved in an oven having a temperature of 80° C. for 24 hours. When the temperature of the battery was lowered to a room temperature, an open-circuit voltage (OCV) was measured. Thereafter, a charging operation was conducted at a current value of 1 mA until a potential difference between the reference electrode and the positive electrode attained to 4.3V, then, the current was stopped for 30 minutes, subsequently, a discharging operation was conducted at a current value of 1mA until the potential difference between the reference electrode and the positive electrode reached to 3V. Then, a difference in the open circuit voltage at a time before and after the battery was preserved at high temperature and a discharging capacity of the battery after the preservation of the battery were measured.

The results of the measurements are shown in Table 1 and Table 2 hereunder.

TABLE 1

| Sample No. | Composition of Active Material Body | Composition of Cover Layer | Crystalline Structure | Synthesizing Temperature of Covering Material (° C.) | Covering Amount (%) | Covering Method | XPS M/Mn |
|---|---|---|---|---|---|---|---|
| Example 1 | $Li_{1.1}Mn_{1.9}O_4$ | $LiAlMnO_4$ | Normal Spinel | 600 | 2.0 | Liquid Phase | 0.14 |
| Example 2 | $Li_{1.1}Mn_{1.9}O_4$ | $LiAlMnO_4$ | Normal Spinel | 550 | 2.0 | Liquid Phase | 0.17 |
| Example 3 | $Li_{1.1}Mn_{1.9}O_4$ | $LiAlMnO_4$ | Normal Spinel | 500 | 2.0 | Liquid Phase | 0.27 |
| Example 4 | $Li_{1.1}Mn_{1.9}O_4$ | $LiAlMnO_4$ | Normal Spinel | 450 | 2.0 | Liquid Phase | 0.38 |
| Example 5 | $Li_{1.1}Mn_{1.9}O_4$ | $LiAlMnO_4$ | Normal Spinel | 400 | 2.0 | Liquid Phase | 0.85 |
| Example 6 | $Li_{1.1}Mn_{1.9}O_4$ | $LiAlMnO_4$ | — | 300 | 2.0 | Liquid Phase | 0.93 |
| Example 7 | $Li_{1.1}Mn_{1.9}O_4$ | $LiAl_4MnO_8$ | Spinel | 500 | 0.5 | Liquid Phase | 0.20 |
| Example 8 | $Li_{1.1}Mn_{1.9}O_4$ | $LiAl_{4.9}Mn_{0.1}O_8$ | Spinel | 500 | 1.0 | Liquid Phase | 4.90 |
| Example 9 | $Li_{1.1}Mn_{1.9}O_4$ | $Li_4Ti_5O_{12}$ | Normal Spinel | 400 | 5.0 | Liquid Phase | 20.00 |
| Example 10 | $Li_{1.1}Mn_{1.9}O_4$ | $Li_4Ti_{4.9}Mn_{0.1}O_{12}$ | Normal Spinel | 400 | 5.0 | Liquid Phase | 19.60 |
| Example 11 | $Li_{1.1}Mn_{1.9}O_4$ | $Li_4Ti_{4.5}Mn_{0.5}O_{12}$ | Normal Spinel | 450 | 1.0 | Liquid Phase | 4.00 |
| Example 12 | $Li_{1.1}Mn_{1.9}O_4$ | $Li_4Ti_{4.0}Mn_{1.0}O_{12}$ | Normal Spinel | 450 | 1.0 | Liquid Phase | 2.05 |
| Example 13 | $Li_{1.1}Mn_{1.9}O_4$ | $Li_4Ti_3Mn_2O_{12}$ | Normal Spinel | 450 | 1.0 | Liquid Phase | 1.21 |
| Example 14 | $Li_{1.1}Mn_{1.9}O_4$ | $Li_4Ti_2Mn_3O_{12}$ | Normal Spinel | 450 | 1.0 | Liquid Phase | 0.52 |
| Example 15 | $Li_{1.1}Mn_{1.9}O_4$ | $Li_4TiMn_4O_{12}$ | Normal Spinel | 450 | 1.0 | Liquid Phase | 0.12 |
| Example 16 | $Li_{1.1}Mn_{1.9}O_4$ | $Li_4Ti_{0.5}Mn_{4.5}O_{12}$ | Normal Spinel | 500 | 1.0 | Liquid Phase | 0.01 |
| Example 17 | $Li_{1.1}Mn_{1.9}O_4$ | $LiAlTiO_4$ | Normal Spinel | 500 | 1.0 | Liquid Phase | 4.51 |
| Example 18 | $Li_{1.1}Mn_{1.9}O_4$ | $LiAlTi_{0.8}Mn_{0.2}O_4$ | Normal Spinel | 500 | 1.0 | Liquid Phase | 3.46 |
| Example 19 | $Li_{1.1}Mn_{1.9}O_4$ | $LiAlTi_{0.6}Mn_{0.4}O_4$ | Normal Spinel | 500 | 1.0 | Liquid Phase | 1.02 |
| Example 20 | $Li_{1.1}Mn_{1.9}O_4$ | $LiAlTi_{0.4}Mn_{0.6}O_4$ | Normal Spinel | 500 | 1.0 | Liquid Phase | 0.51 |
| Example 21 | $Li_{1.1}Mn_{1.9}O_4$ | $LiAlTi_{0.2}Mn_{0.8}O_4$ | Normal Spinel | 500 | 1.0 | Liquid Phase | 0.01 |

| Sample No. | Discharging Capacity at 1'st Cycle (mAh/g) | Discharging Capacity at 30th cycle (mAh/g) | OCV-Difference after Preservation (V) | Capacity after Preservation (mAh/g) | 3V capacity after Preservation at 50° C. (mAh/g) | Discharging Capacity after 100 cycles at 55° C. (mAh/g) |
|---|---|---|---|---|---|---|
| Example 1 | 110 | 85 | −0.36 | 80 | 36 | 71 |
| Example 2 | 110 | 88 | −0.34 | 87 | 30 | 72 |
| Example 3 | 105 | 89 | −0.21 | 87 | 12 | 81 |
| Example 4 | 103 | 91 | −0.17 | 89 | 10 | 80 |
| Example 5 | 98 | 85 | −0.15 | 87 | 5 | 78 |
| Example 6 | 91 | 84 | −0.15 | 86 | 5 | 75 |
| Example 7 | 102 | 86 | −0.24 | 85 | 13 | 76 |
| Example 8 | 91 | 90 | −0.18 | 87 | 5 | 80 |
| Example 9 | 94 | 91 | −0.15 | 88 | 4 | 84 |
| Example 10 | 100 | 96 | −0.15 | 95 | 5 | 85 |
| Example 11 | 103 | 93 | −0.17 | 92 | 5 | 85 |
| Example 12 | 109 | 100 | −0.19 | 98 | 1 | 85 |
| Example 13 | 112 | 103 | −0.18 | 97 | 1 | 86 |
| Example 14 | 114 | 101 | −0.20 | 93 | 3 | 83 |
| Example 15 | 115 | 92 | −0.31 | 84 | 32 | 81 |
| Example 16 | 115 | 81 | −0.36 | 79 | 50 | 70 |
| Example 17 | 103 | 91 | −0.15 | 90 | 5 | 82 |
| Example 18 | 109 | 96 | −0.16 | 96 | 5 | 86 |

TABLE 1-continued

| | | | | | | |
|---|---|---|---|---|---|---|
| Example 19 | 113 | 104 | −0.18 | 99 | 1 | 86 |
| Example 20 | 115 | 100 | −0.17 | 100 | 3 | 85 |
| Example 21 | 114 | 80 | −0.37 | 82 | 49 | 72 |

| Sample No. | Composition of Active Material Body | Composition of Cover Layer | Crystalline Structure | Synthesizing Temperature of Covering Material (° C.) | Covering Amount (%) | Covering Method | XPS M/Mn |
|---|---|---|---|---|---|---|---|
| Example 22 | $LiMn_{1.7}Co_{0.3}O_4$ | $Li_2Sn_{0.5}Mn_{0.5}O_3$ | Rock-Salt | 900 | 1.0 | Solid Phase Mixing | 0.01 |
| Example 23 | $LiMn_{1.7}Co_{0.3}O_4$ | $Li_2Ti_{0.5}Mn_{0.5}O_3$ | Rock-Salt | 900 | 1.0 | Solid Phase Mixing | 0.10 |
| Example 24 | $LiMn_{1.7}Co_{0.3}O_4$ | $LiGa_{0.8}Mn_{0.2}O_2$ | Distortion Spinel | 300 | 1.0 | Liquid Phase | 0.40 |
| Example 25 | $LiMn_{1.7}Co_{0.3}O_4$ | $LiSb_{0.5}Mn_{1.5}O_4$ | Distortion Spinel | 500 | 2.0 | Liquid Phase | 0.07 |
| Example 26 | $LiMn_{1.7}Co_{0.3}O_4$ | $LiSc_{0.7}Mn_{0.3}O_{2.1}$ | — | 500 | 2.0 | Liquid Phase | 0.47 |
| Example 27 | $LiMn_{1.7}Co_{0.3}O_4$ | $LiAlMnO_4$ | Normal Spinel | 450 | 5.0 | Liquid Phase | 0.75 |
| C. Example 1 | $LiMn_{1.7}Co_{0.3}O_4$ | — | — | — | 0.0 | — | 0.00 |
| C. Example 2 | $Li_{1.1}Mn_{1.9}O_4$ | $LiAl_{5.4}(OH)_{17.2}$ | — | 120 | 9.9 | Liquid Phase | 22.00 |
| C. Example 3 | $Li_{1.1}Mn_{1.9}O_4$ | $LiAlO_2$ | — | 600 | 0.8 | Liquid Phase | 20.10 |
| C. Example 4 | $Li_{1.1}Mn_{1.9}O_4$ | $B_2O_3$ | — | 600 | 1 | Solid Phase Mixing | 21.00 |
| C. Example 5 | $Li_{1.1}Mn_{1.9}O_4$ | $SiO_2$ | — | 600 | 1 | Liquid Phase | 20.70 |
| C. Example 6 | $Li_{1.1}Mn_{1.9}O_4$ | $LiBO_2$ | — | 600 | 1 | Solid Phase Mixing | 20.10 |
| C. Example 7 | $Li_{1.1}Mn_{1.9}O_4$ | $H_3BO_3$ | — | 600 | 2.0 | Solid Phase Mixing | 23.10 |

| Sample No. | Discharging Capacity at 1'st Cycle (mAh/g) | Discharging Capacity at 30th cycle (mAh/g) | OCV-Difference after Preservation (V) | Capacity after Preservation (mAh/g) | 3V capacity after Preservation at 50° C. (mAh/g) | Discharging Capacity after 100 cycles at 55° C. (mAh/g) |
|---|---|---|---|---|---|---|
| Example 22 | 124 | 81 | −0.37 | 84 | 50 | 61 |
| Example 23 | 124 | 83 | −0.34 | 87 | 30 | 62 |
| Example 24 | 92 | 78 | −0.18 | 74 | 10 | 68 |
| Example 25 | 96 | 78 | −0.32 | 79 | 33 | 70 |
| Example 26 | 95 | 74 | −0.22 | 80 | 10 | 66 |
| Example 27 | 124 | 84 | −0.30 | 94 | 10 | 77 |
| C. Example 1 | 125 | 61 | −0.51 | 74 | 52 | 33 |
| C. Example 2 | 51 | 30 | −0.40 | 10 | 2 | 25 |
| C. Example 3 | 112 | 101 | −0.17 | 102 | 5 | 40 |
| C. Example 4 | 91 | 54 | −0.40 | 61 | 67 | 20 |
| C. Example 5 | 20 | ~0 | −0.15 | 0 | 10 | (Interrupted) |
| C. Example 6 | 91 | 59 | −0.40 | 64 | 64 | 28 |
| C. Example 7 | 89 | 54 | −0.38 | 54 | 51 | 20 |

Note, the crystalline structures of the cover layers shown in Table 1 and Table 2 were identified in accordance with a method in which only the covering materials having a predetermined composition were synthesized, thereafter, a structural analysis by an X-ray diffraction (XRD) method was conducted with respect to each of the synthesized substances. Among the data shown in Table 1 and Table 2, "3V-capacity after preservation at 50° C." denotes 3V-charging capacity measured in such a manner that after the respective batteries were preserved at 50° C. for 24 hours, the temperature was lowered to a room temperature, then the capacity was measured at a time when the battery was charged until 4.3V. Further, 3V-charging capacity is defined as a charging capacity required for the positive electrode potential to reach to 3.4V with respect to the reference electrode.

As is clear from the results shown in Table 1 and Table 2, in the non-aqueous secondary batteries according to the respective Examples in which positive electrode active material formed with the cover layer having a predetermined range of the number of metal atoms with respect to the number of Mn atoms was used or in which positive electrode active material formed with the cover layer having a normal spinel structure was used, the lowering of the discharging capacity is small in comparison with the batteries of Comparative Examples even after the charging/discharging cycle was repeated 100 cycles. In addition, it was confirmed that the lowering of the open-circuit voltage and the capacity were small even after the batteries were preserved at high temperature, thus enabling the batteries to exhibit excellent battery characteristics.

The positive electrode active material according to Example 9 was prepared in accordance with the following another method. Namely, $LiOH.H_2O$ powder and $MnO_2$ (electrolytic manganese) powder were blended so as to have an atomic ratio of Li:Mn=1.1:1.9, then sufficiently mixed to form a powder mixture. The powder mixture was fired in an oxygen atmosphere at a temperature of 750° C. thereby to obtain an active material body ($Li_{1.1}Mn_{1.9}O_4$).

Next, 30 ml of pure water was added to 10 g of the above active material body thereby to prepare a suspended solution. On the other hand, lithium nitrate and isopropoxy tri(N-aminoethyl-aminoethyel) titanate were blended in water so as to have an atomic ratio Li/Ti was 4/5 thereby to prepare a mixed liquid. The mixed liquid was added to the above suspended solution thereby to prepare a slurry. Then, the slurry was subjected to a heat treatment at a temperature of 400° C. thereby to obtain a positive electrode active material.

Using this positive electrode active material, a non-aqueous secondary battery was prepared and battery characteristics thereof were evaluated. As a result, the same result as in the positive electrode active material of previous Example 9 was obtained.

EXAMPLES 31–34
and

Comparative Examples 11–14

In accordance with the following process, non-aqueous secondary batteries (battery cells, battery bath) for evaluating the positive electrodes according to the respective Examples and Comparative Examples were prepared as shown in FIG. 1. Then, the characteristics of the batteries were comparatively evaluated.

[Preparation of Positive Electrode Active Materials]

$LiOH.H_2O$ powder, $MnO_2$ (electrolytic manganese) powder and oxide powder containing substituting element (M) were blended so as to have an atomic ratio of Li:Mn:M= 1:1.7:0.3 and compositions indicated in a left column of Table 3, then uniformly mixed to form material powder mixtures. Each of the material powder mixtures was fired in reflux of oxygen at a temperature of 750° C. for 15 hours, thereby to prepare positive electrode active material powder bodies each composed of Li-Mn type composite oxide, respectively.

Then, 30 ml of pure water was added to 10 g of each of the above positive electrode active material bodies thereby to prepare the respective suspended solutions. Subsequently, lithium nitrate and aluminum nitrate or $5TiO_2.N_2O_5.6H_2O$ were blended so as to have atomic ratios of compositions of surface treating materials shown in Table 3, then uniformly mixed to form material mixtures. Each of the material mixtures was added to the respective suspended solutions and sufficiently stirred. Thereafter, each of the suspended solutions was subjected to heating and dehydrating treatment, then sintered in reflux of oxygen at temperature of 600° C., thereby to prepare the respective positive electrode active materials according to Examples 31–34 in which a cover layer was integrally formed on a surface of the active material body.

On the other hand, positive electrode active materials according to Comparative Examples 11–14 were prepared in such a manner that each of the positive electrode active material bodies prepared in Examples 31–34 was not subjected to the surface treatment so that the cover layer was not formed, and the active material bodies of Examples 31–34 were used as the positive electrode active materials of Comparative Examples 11–14 as they were.

[Preparation of Positive Electrodes]

Thus prepared respective positive electrode active materials, acetylene black as a conduction promoting agent and teflon powder as a binder were blended so as to have a weight ratio of 80:17:3 thereby to prepare the respective positive electrode material mixtures. Then, the respective positive electrode material mixtures were attached to collectors formed of stainless steel, thereby to form the positive electrodes each having a size of 10 mm×10 mm×0.5 mm, respectively.

[Preparation of Negative Electrode]

Lithium metal foil was integrally attached to a collector formed of stainless steel thereby to prepare a negative electrode, respectively.

[Preparation of Reference Electrode]

Lithium metal foil was integrally attached to a collector formed of stainless steel thereby to prepare a reference electrode having a size of 10 mm×10 mm.

[Preparation of Non-aqueous Electrolyte]

As shown in Table 3, predetermined amount of lithium salts as electrolyte were dissolved into various mixed solvents so that the concentrations of lithium salts were controlled to 0.3–3.0 M, thereby to prepare non-aqueous electrolytes for the respective batteries.

[Preparation of Battery (battery cell) for Evaluating Positive Electrode]

The battery members such as the positive electrode, negative electrode, reference electrode and non-aqueous electrolytes which had been sufficiently dried were placed in argon atmosphere. Using these battery members, batteries each comprising a beaker-shaped glass cell for evaluating the non-aqueous secondary batteries according to Examples and Comparative Examples were assembled as shown in FIG. 1.

[Evaluation of Battery]

With respect to thus prepared respective batteries for evaluating the non-aqueous secondary batteries according to Examples and Comparative Examples, a potential between the positive electrode and the reference electrode was measured and recorded as the open-circuit voltage (OCV) before the preservation at high temperature. Next, the respective batteries for evaluation were preserved in an oven having a constant-temperature of 50° C. for 24 hours. Then, after the temperature of the batteries was lowered to a room temperature, a potential between the positive electrode and the reference electrode was measured and recorded as the open-circuit voltage (OCV) after the preservation at high temperature.

Thereafter, a charging operation was conducted at a current value of imA until a voltage between the reference electrode and the positive electrode attained to 4.3V. In this charging test, a capacity at 3.4 volts or less was measured as 3V charging/discharging capacity. The respective results of the measurements are shown in Table 3 hereunder.

TABLE 3

| Sample No. | Composition of Positive Electrode Active Material Body | Surface Treating Material (Cover Layer) | Covering Amount (%) | Weight of Active Material (g) | Electrolyte Salt | Electrolyte Solvent |
|---|---|---|---|---|---|---|
| Example 31 | $LiCo_{0.3}Mn_{1.7}O_4$ | $LiMnAlO_4$ | 1 | 0.05 | $LiPF_6$ | EC/EMC |
| Example 32 | $Li_{1.04}Mn_{1.96}O_4$ | $LiMnAlO_4$ | 1 | 0.04 | $LiPF_6$ | EC/EMC |
| Example 33 | $LiAl_{0.3}Mn_{1.7}O_4$ | $LiMnAlO_4$ | 2 | 0.03 | $LiBF_4$ | EC/DMC |
| Example 34 | $LiCr_{0.3}Mn_{1.7}O_4$ | $LiMnTiO_4$ | 2 | 0.03 | $LiClO_4$ | PC/EC |
| C. Example 11 | $LiCo_{0.3}Mn_{1.7}O_4$ | — | — | 0.05 | $LiPF_6$ | EC/EMC |
| C. Example 12 | $Li_{1.04}Mn_{1.96}O_4$ | — | — | 0.04 | $LiPF_6$ | EC/EMC |
| C. Example 13 | $LiAl_{0.3}Mn_{1.7}O_4$ | — | — | 0.04 | $LiPF_6$ | EC/EMC |
| C. Example 14 | $LiCr_{0.3}Mn_{1.7}O_4$ | — | — | 0.04 | $LiPF_6$ | EC/EMC |

| Sample No. | Electrolyte Addition Concentration (M) | Electrolyte Addition Amount (ml) | Open-Circuit Voltage (V) Before Preservation | Open-Circuit Voltage (V) After Preservation | 3 V Charging Capacity After Preservation at 50° C. (mAh/g) |
|---|---|---|---|---|---|
| Example 31 | 1.0 | 10 | 3.23 | 3.07 | 36 |
| Example 32 | 3.0 | 28 | 3.23 | 3.06 | 45 |
| Example 33 | 0.3 | 21 | 3.22 | 3.06 | 41 |
| Example 34 | 2.0 | 21 | 3.22 | 3.06 | 45 |
| C. Example 11 | 1 | 10 | 3.23 | 2.94 | 52 |
| C. Example 12 | 3 | 28 | 3.23 | 2.94 | 106 |
| C. Example 13 | 3 | 28 | 3.23 | 2.94 | 61 |
| C. Example 14 | 3 | 28 | 3.23 | 2.94 | 72 |

As is clear from the results shown in Table 3, in the battery cells according to the respective Examples in which the cover layer composed of metal oxide composited with lithium was formed on a surface of the active material body, it was confirmed that 3V charging capacity after the battery was preserved at 50° C. for 24 hours can be suppressed to be 50 mAh/g or less.

On the other hand, in case of the battery cells according to the respective Comparative Examples using the positive electrode active materials having no cover layer, it was confirmed that the lowering of the open-circuit voltage (OCV) after the preservation at high temperature became large, and an increase of 3V charging capacity became remarkable.

EXAMPLE 35–38 and

Comparative Examples 15–18

Figure 2:
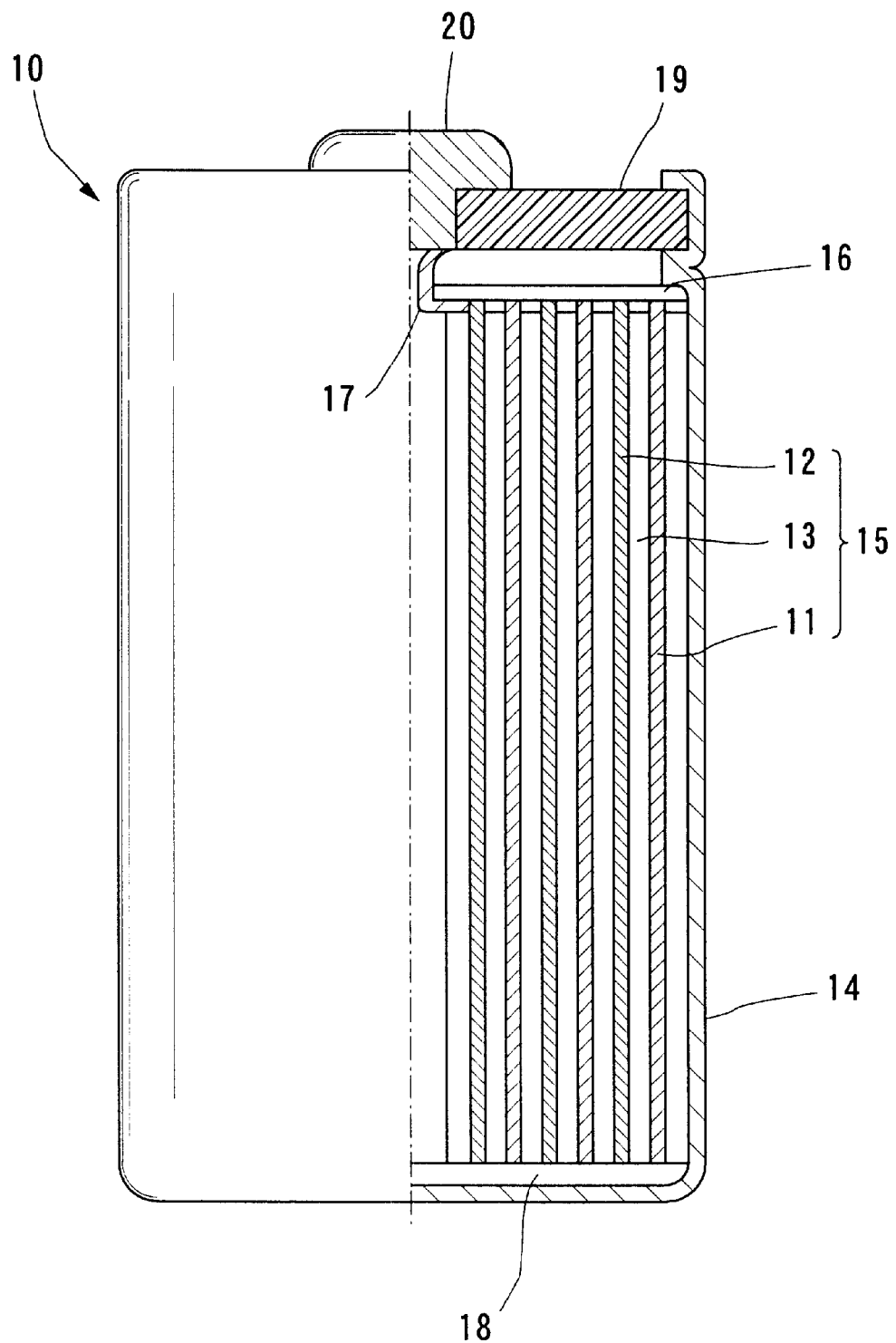
FIG. 2 is a view, half in section, showing an example of a structure of a non-aqueous secondary battery according to the present invention.

In accordance with the following process, non-aqueous secondary batteries according to the respective Examples and Comparative Examples were prepared as shown in FIG. 2. Then, the characteristics of the batteries were comparatively evaluated.

[Preparation of Positive Electrodes]

With respect to 88 parts by weight of the respective positive electrode active materials prepared in Examples 31–34 and Comparative Examples 11–14, 3 parts by weight of acetylene black and 4 parts by weight of graphite as conductive fillers and 5 parts by weight of polyvinylidene fluoride as binder were mixed thereby to form respective mixtures. Thus obtained each of the mixtures was wet-mixed with N-methyl-2-pyrolidone as a solvent thereby to prepare pastes, respectively.

Next, each of the pastes was uniformly coated onto both surfaces of an aluminum foil having a thickness of 0.02 mm which is formed to be a collector. After the coated collector was dried, the collector was pressingly molded by means of a roller pressing machine thereby to prepare a belt-shaped positive electrode 12. In this regard, by changing the molding pressure at the pressingly molding operation by means of the roller pressing machine, a porosity of the active material layer molded on the aluminum foil was controlled as shown in Table 4.

[Preparation of Negative Electrode]

On the other hand, with respect to 88 parts by weight of mesocarbon micro beads (BET surface area:0.8 $m^2/g$ and $d_{002}$:3.37 angstroms) which had been subjected to a heat treatment at 2800° C., 2 parts by weight of acetylene black and 10 parts by weight of polyvinylidene fluoride (PVDF) as binder were mixed thereby to form a mixture. Thus obtained mixture was wet-mixed with N-methyl-2-pyrolidone as a solvent thereby to prepare a paste. Next, the paste was uniformly coated onto both surfaces of a copper foil having a thickness of 0.01 mm which is formed to be a collector. After the coated collector was dried, the collector was pressingly molded by means of the roller pressing machine thereby to prepare a belt-shaped negative electrode 11.

[Assembling of Battery]

Using the negative electrode 11 and the respective positive electrodes 12 as prepared above, non-aqueous secondary batteries 10 according to the respective Examples and Comparative Examples having a structure shown in FIG. 2 were assembled.

That is, in the respective non-aqueous secondary batteries 10, a cylindrical battery container 14 with a bottom which is composed of stainless steel is provided with an insulating material 18 at the bottom of the container 14. An electrode group 15 are accommodated in the aforementioned battery container 14. The electrode group 15 are formed so as to have a structure in which the positive electrode 12, a separator 13 and the negative electrode 11 are laminated in this order to form a belt-shaped laminated body and the laminated body is wound up or curled in a spiral-form so that the negative electrode 11 is positioned outside.

The separator 13 is formed, for example, from non-woven fabric, polypropylene porous film or the like. The electrolyte is packed in the battery container 14. An insulating seal plate 19 having an opening at central portion thereof is provided to an upper opening portion of the battery container 14, and the insulating seal plate 19 is fluid-tightly fixed to the battery container 14 by inwardly caulking the upper opening portion of the battery container 14. The positive electrode terminal 20 is interfitted into a central portion of the insulating seal plate 19. One end of the positive electrode lead 17 is connected to the positive electrode while the other end of the lead 17 is connected to the positive electrode terminal 20. The negative electrode 11 is connected to the battery container 14 as a negative electrode terminal through a negative electrode lead (not shown).

[Evaluation of Battery]

With respect to thus prepared respective lithium ion secondary batteries according to Examples and Comparative Examples, the following two types of evaluation tests were conducted.

(1) Evaluation Test for Cycle Characteristic at 55° C.

With respect to each of the secondary batteries, a charging operation was conducted at a current value of 1C until a potential difference between the positive electrode and the negative electrode attained to 4.3V, subsequently, further charging operation was conducted at a constant voltage for 4 hours. Thereafter, the current was stopped for 30 minutes, then a discharging operation was conducted at a current value of 1C until the potential difference between the positive electrode and the negative electrode reached to 3V, then, the current was again stopped for 30 minutes. A cycle test in which the above charging/discharging cycle was repeated 30 times(cycles) was conducted in an oven of which temperature is controlled to 55° C. Then, a ratio of battery capacity after 30 cycles with respect to an initial capacity (at first cycle) was measured as 55° C.-cycle retention ratio. The results are shown in Table 4.

(2) Evaluation Test for Preservation Characteristic at 80° C.

With respect to each of the secondary batteries, a charging operation was conducted under a room temperature (25° C.) at a current value of 1C until a potential difference between the positive electrode and the negative electrode attained to 4.3V, subsequently, further charging operation was conducted at a constant voltage for 4 hours. Thereafter, the current was stopped for 30 minutes, then a discharging operation was conducted at a current value of 1C until the potential difference between the positive electrode and the negative electrode reached to 3V, then, the battery was preserved for 24 hours in an oven of which temperature was controlled to 80° C. Then, after the temperature of the battery was returned to the room temperature, a charging operation was conducted at a current value of 1C until a potential difference between the positive electrode and the negative electrode attained to 4.3V, subsequently, further charging operation was conducted at a constant voltage for 4 hours. Thereafter, a discharging operation was conducted at a current value of 1C until the potential difference between the positive electrode and the negative electrode reached to 3V. Under the above conditions, a ratio of the discharging capacity after the preservation at high temperature with respect to the discharging capacity before the preservation was measured as discharging capacity ratio of after/before the preservation at 80° C. The results are shown in Table 4 indicated hereunder.

TABLE 4

| Sample No. | Composition of Positive Electrode Active Material Body | Surface Treating Material (Cover Layer) | Covering Amount (%) | Porosity (%) | Electrolyte Salt | Solvent | Concentration (M) | 55° C.-Cycle Retention Ratio (%) | Discharging Capacity Ratio of After/Before Preservation at 80° C. (%) |
|---|---|---|---|---|---|---|---|---|---|
| Example 35 | $LiCo_{0.3}Mn_{1.7}O_4$ | $LiMnAlO_4$ | 1 | 16 | $LiPF_6$ | EC/EMC | 1.0 | 68.3 | 75.1 |
| Example 36 | $Li_{1.04}Mn_{1.96}O_4$ | $LiMnAlO_4$ | 1 | 20 | $LiPF_6$ | EC/EMC | 3.0 | 77.3 | 72.7 |
| Example 37 | $LiAl_{0.3}Mn_{1.7}O_4$ | $LiMnAlO_4$ | 2 | 15 | $LiBF_4$ | EC/DMC | 0.3 | 75.3 | 72.3 |
| Example 38 | $LiCr_{0.3}Mn_{1.7}O_4$ | $LiMnAlO_4$ | 2 | 17 | $LiClO_4$ | PC/EC | 2.0 | 79.0 | 71.7 |
| C. Example 15 | $LiCo_{0.3}Mn_{1.7}O_4$ | — | — | 15 | $LiPF_6$ | EC/EMC | 1.0 | 66.6 | 58.6 |
| C. Example 16 | $Li_{1.04}Mn_{1.96}O_4$ | — | — | 16 | $LiPF_6$ | EC/EMC | 3.0 | 12.5 | 52.5 |
| C. Example 17 | $LiAl_{0.3}Mn_{1.7}O_4$ | — | — | 18 | $LiBF_4$ | EC/DMC | 0.3 | 24.5 | 56.7 |
| C. Example 18 | $LiCr_{0.3}Mn_{1.7}O_4$ | — | — | 19 | $LiClO_4$ | PC/EC | 2.0 | 18.5 | 55.3 |

As is clear from the results shown in Table 4, in the lithium ion secondary batteries according to the respective Examples in which the cover layer composed of metal oxide composited with lithium was formed on a surface of the positive electrode active material body, it was confirmed that the lowering of the battery capacity was small even if the batteries were operated at high temperature of 55° C. in comparison with the respective secondary batteries according to Comparative Examples having no cover layer, and the batteries of Examples were proved to have an excellent high-temperature-cycle-characteristic. In addition, even after the batteries were preserved under a high temperature condition of 80° C., a decreasing amount of the battery capacity was small, thus providing excellent battery characteristics.

Industrial Applicability

As described above, the positive electrode active material and the non-aqueous secondary battery using the same according to the present invention can effectively suppress the deterioration of the battery capacity in accordance with the advancement of charging/discharging cycles at a high temperature, and can suppress the lowering of the open-circuit voltage (OCV) and capacity of the battery even after the battery is preserved at a high temperature.

What is claimed is:

1. A positive electrode active material comprising:

a positive electrode active material body having a composition of $Li_{1+x}Mn_{2-x-y}M_yO_4$ wherein M denotes at least one element selected from elements other than Mn, alkaline metal elements and alkaline earth metal elements, $0 \leq x \leq 0.2$ and $0 \leq y \leq 0.3$; and a cover layer formed on a surface of said positive electrode active material body, said cover layer being composed of a metal oxide containing at least Mn and Li;

wherein the number of metal atoms other than Mn and Li, which constitute said cover layer, is 0.01–20 times the number of Mn atoms when the cover layer is subjected to X-ray photoelectric spectroscopy (XPS).

2. A positive electrode active material according to claim 1, wherein said cover layer contains at least one metal element selected from the group consisting of III, IV, V family elements in a periodic table.

3. A positive electrode active material according to claim 1, wherein said cover layer contains Al.

4. A positive electrode active material according to claim 1, wherein said cover layer contains Ti.

5. A positive electrode active material according to claim 1, wherein 3 V charging capacity per unit weight of said positive electrode active material is 50 mAh/g or less when a charging reaction is performed under conditions such that said positive electrode active material is composed of spinel-type lithium-manganese composite oxide, a positive electrode composed of said positive electrode active material and a lithium metal electrode are provided in a non-aqueous electrolyte of which lithium salt concentration is 0.3–3.0 M and amount of said non-aqueous electrolyte corresponds to 200–700 ml per 1 gram of said positive electrode active material thereby to form a battery bath, and after said battery bath is retained at 50° C. for 24 hours, said charging reaction is performed in a state where a positive electrode potential with respect to $Li/Li^+$ is 4V or less.

6. A non-aqueous secondary battery using a positive electrode active material comprising:

a positive electrode active material body having a composition of $Li_{1+x}Mn_{2-x-y}M_yO_4$ wherein M denotes at least one element selected from elements other than Mn, alkaline metal elements and alkaline earth metal elements, $0 \leq x \leq 0.2$ and $0 \leq y \leq 0.3$; and a cover layer formed on a surface of said positive electrode active material body, said cover layer being composed of a metal oxide containing at least Mn and Li;

wherein the number of metal atoms other than Mn and Li, which constitute said cover layer, is 0.01–20 times the number of Mn atoms when the cover layer is subjected to X-ray photoelectric spectroscopy (XPS).

7. A positive electrode active material comprising:

a positive electrode active material particle having a composition of to $Li_{1+x}Mn_{2-x-y}M_yO_4$ wherein M denotes at least one element selected from elements other than Mn, alkaline metal elements and alkaline earth metal elements, wherein $0 \leq x \leq 0.2$ and $0 \leq y \leq 0.3$; and a cover layer formed on at least part of a surface of said positive electrode active material particle, wherein said cover layer is composed of a metal oxide composited with Li, wherein said cover layer has a normal spinel structure, wherein said cover layer is formed by a liquid-phase mixing method and wherein said cover layer contains Ti.

* * * * *